(12) United States Patent
Boden et al.

(10) Patent No.: US 6,978,308 B2
(45) Date of Patent: Dec. 20, 2005

(54) SYSTEM AND METHOD FOR NESTING VIRTUAL PRIVATE NETWORKING CONNECTIONS WITH COINCIDENT ENDPOINTS

(75) Inventors: Edward B. Boden, Vestal, NY (US); Franklin A. Gruber, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 09/813,911

(22) Filed: Mar. 21, 2001

(65) Prior Publication Data
US 2002/0138623 A1 Sep. 26, 2002

(51) Int. Cl.[7] ............................................. G06F 15/16
(52) U.S. Cl. ........................ 709/229; 713/153; 370/389
(58) Field of Search ................................ 709/202, 224, 709/227, 237, 225, 226, 229, 249, 200; 713/153, 713/200, 201; 370/389, 237, 256, 392; 707/10; 380/23; 340/5

(56) References Cited

U.S. PATENT DOCUMENTS

| | | | |
|---|---|---|---|
| 5,430,727 A | | 7/1995 | Callon ...................... 370/85.13 |
| 5,485,460 A | | 1/1996 | Schrier et al. .............. 370/94.1 |
| 5,519,704 A | | 5/1996 | Farinacci et al. ......... 370/85.13 |
| 5,613,096 A | | 3/1997 | Danknick .................... 395/500 |
| 5,710,908 A | | 1/1998 | Man ............................ 395/500 |
| 6,055,236 A | * | 4/2000 | Nessett et al. ............... 370/389 |
| 6,330,562 B1 | * | 12/2001 | Boden et al. .................. 707/10 |
| 6,381,646 B2 | * | 4/2002 | Zhang et al. ................ 709/227 |
| 6,438,612 B1 | * | 8/2002 | Ylonen et al. ............... 709/249 |
| 6,449,272 B1 | * | 9/2002 | Chuah et al. ................ 370/389 |
| 6,473,798 B1 | * | 10/2002 | Grosser et al. ............. 709/224 |
| 6,591,306 B1 | * | 7/2003 | Redlich ....................... 709/245 |
| 6,615,349 B1 | * | 9/2003 | Hair ............................ 713/165 |
| 6,615,357 B1 | * | 9/2003 | Boden et al. ................ 713/201 |
| 6,633,571 B1 | * | 10/2003 | Sakamoto et al. .......... 370/401 |
| 6,643,776 B1 | * | 11/2003 | Boden et al. ................ 713/200 |
| 6,668,282 B1 | * | 12/2003 | Booth et al. ................ 709/224 |
| 6,671,729 B1 | * | 12/2003 | Gordon et al. .............. 709/227 |
| 6,674,756 B1 | * | 1/2004 | Rao et al. ............... 370/395.21 |
| 6,704,282 B1 | * | 3/2004 | Sun et al. .................... 370/237 |
| 6,751,729 B1 | * | 6/2004 | Giniger et al. .............. 713/153 |
| 6,765,881 B1 | * | 7/2004 | Rajakarunanayake ....... 370/256 |
| 6,836,481 B1 | * | 12/2004 | Hotta .......................... 370/392 |
| 6,839,732 B1 | * | 1/2005 | Vincent et al. ............. 709/202 |
| 6,862,622 B2 | * | 3/2005 | Jorgensen ................... 709/226 |
| 2002/0069278 A1 | * | 6/2002 | Forslow ...................... 709/225 |
| 2002/0099854 A1 | * | 7/2002 | Jorgensen ................... 709/249 |
| 2002/0133534 A1 | * | 9/2002 | Forslow ...................... 709/200 |

OTHER PUBLICATIONS

Segmented Integer Counter Mode: Specification and Rationale—McGrew (2000); www.mindspring.com/~dmcgrew/sic-mode.pdf.*

(Continued)

Primary Examiner—Thong Vu
(74) Attorney, Agent, or Firm—Shelley M. Beckstrand

(57) ABSTRACT

A communication network includes a plurality of nodes, selectively including a client, a remote gateway Internet service provider, the Internet, a local enterprise gateway, and an enterprise internal network. A local coincident endpoint is established at a first node for an outer connection with a remote node and an inner connection with a different remote node. The nodes participate in negotiations on the outer connection to set up the inner connection as a secure connection. Thereafter, responsive to communications on the inner connection, the first node establishes links to the outer connection selectively to receive or send communications double nested on the outer connection.

19 Claims, 5 Drawing Sheets

OTHER PUBLICATIONS

Toward Quality of Security Service in a Resource Management . . . —Irvine, Levin (2000); taurus.cs.nps.navy.mil/pub/irvine/00/HCW00-ToQoSSBeneFN.ps.*

Securing the Border Gateway Routing Protocol—Smith, Garcia-Luna-Aceves (1996) ftp.cs.umass.edu/pub/net/pub/hgschulz/i96/smith.ps.gz.*

A Multi-Layer IPsec Protocol—Zhang, Singh (2000); www.wins.hrl.com/people/ygz/papers/usenix00.ps.gz.*

Combining Indexing Technique with Path Dictionary for Nested Object . . . —Lee (1995) ; www.cs.ust.hk/faculty/dlee/Papers/oo/dasfaa95.ps.gz.*

An Extended Transaction Service for Real-Time and Telecom Object . . . —Grasso (1996) ; www.infosys.tuwien.ac.at/Research/Corba/archive/special/xts.ps.gz.*

Transformations for Imperfectly Nested Loops—Kodukula, Pingali (1996) ; simon.cs.cornell.edu/Info/People/prakas/papers/sc96.ps.*

Fortran RED—A Retargetable Environment for Automatic Data Layout—Kremer (1998) ; www.cs.rutgers.edu/~uli/LCPC98.ps.*

Network Working Group B. Patel Request for Comments: 3193 . . . —Status Of This www.tzi.de/~cabo/pdfrfc/rfc3193.txt.pdf.*

On the Cost of Virtual Private Networks—Cohen, Kaempfer (2000) www.cs.technion.ac.il/~rcohen/PAPERS/VPN.pdf.*

Global Nested Transaction Management for ODMG-Compliant . . . —Tesch, Wäsch (1997) ftp.darmstadt.gmd.de/pub/dimsys/reports/P-97-06.ps.Z.*

Secure Mobile Networking—12th Quarterly Report—Binkley, McHugh (1998) www.cs.pdx.edu/research/SMN/3q98.ps.*

A Client/Server Architecture for Distributed Workflow . . . —Hans Schuster www.buva.sowi.uni-bamberg.de/ps-Sammlung/literatur/workflowUnterlagen/jablonski/SJKB94.ps.gz.*

* cited by examiner

| IKESIP | IKEDIP | CONNECTION NAME | TIMESTAMP | REFCOUNT |
|--------|--------|-----------------|-----------|----------|
| 200 | 202 | 204 | 206 | 208 |

FIG. 4

| STEP | CLIENT PC (10) | INTERNET SERVICE PROVIDER (12) | ENTERPRISE GATEWAY (16) |
|---|---|---|---|
| 1 > | ip, udp(ike), data | ip, ah, ip, udp(ike), data | ip, udp(ike), data |
| 1 < | ip, udp(ike), data | ip, udp(ike), data | ip, ah, ip, udp(ike), data |
| 2a > | ip, esp, data | ip, ah, ip, esp, data | ip, esp, data → ip, data |
| 2a < | ip, data | ip, esp, data | ip, ah, ip, esp, data ← ip, esp, data ← ip, data |
| 2b > | ip, esp, ip, data | ip, ah, ip, esp, ip, data | ip, esp, ip, data → ip, data |
| 2b < | ip, data | ip, esp, ip, data | ip, ah, ip, esp, ip, data ← ip, esp, ip, data ← ip, data |

FIG. 5

SYSTEM AND METHOD FOR NESTING VIRTUAL PRIVATE NETWORKING CONNECTIONS WITH COINCIDENT ENDPOINTS

CROSS REFERENCES TO RELATED APPLICATIONS

U.S. patent application Ser. No. 09/813,910 filed 21 Mar. 2001 entitled "SYSTEM AND METHOD FOR VIRTUAL PRIVATE NETWORK NETWORK ADDRESS TRANSLATION PROPAGATION OVER NESTED CONNECTIONS WITH COINCIDENT LOCAL ENDPOINTS" is assigned to the same assignee hereof and contains subject matter related, in certain respect, to the subject matter of the present application. The above-identified patent application is incorporated herein by reference.

BACKGROUND OF THE INVENTION

1. Technical Field of the Invention

This invention pertains to network communications. More particularly, it relates to the nesting of virtual private network (VPN) tunnels, or connections, with coincident local endpoints.

2. Background Art

An important use of virtual private networking (VPN) is to allow a remote user or small branch office to connect to an enterprise via the Internet. The basic scenario for so doing is illustrated in FIG. 1. Personal computer (PC) 10 represents a remote user, or client, connecting through an Internet Service Provider (ISP, such as SprintNet, AT&T, AOL, or the like) 12 via Internet 14 to a VPN gateway 16 (also referred to as an enterprise gateway) for the enterprise. Typically in this scenario the user at PC 10 desires to connect to some server, such as a Lotus Notes server, within the internal network 18 of a company or enterprise.

A typical configuration for doing this connection of PC 10 to a server within internal network 18 uses two VPN connections (also referred to as tunnels) t1 20 and t2 22. Tunnel t1 20 begins at ISP 12 and ends at gateway 16. Tunnel t2 begins at PC 10, is nested within tunnel t1 20, then continues on to the company server internal to network 18. (By "Internet", reference is made to a specific internet—the one usually referred to today. This "Internet" is implemented by a well defined set of system routers, available from many vendors. By "internet", reference is usually made to any network that has its own well defined domain, routing, and other properties. These networks are usually TCP/IP based.) ISP's 12 are generally located outside of Internet 14, but not always. IBM, for example, connects directly to an AT&T ISP which is inside the Internet.

If PC 10 has a dedicated, or permanent, Internet Protocol (IP) address, this all works fine. However, it much more likely that PC 10 has an IP address which is dynamically assigned by ISP 12 and which may be, in general, from one of several designated private IP address ranges. This raises the possibility, if not likelihood, of the same IP address being assigned to a plurality of clients 10 seeking access through gateway 16. To support such remote users 10, the company gateway 16 needs some way to handle the dynamically assigned IP address and allow it through to its internal network 18.

It is an object of the invention to provide an improved method and system for managing connections within a communications system.

It is a further object of the invention to provide an improved method and system for connecting a remote client to an enterprise network through a local gateway.

It is a further object of the invention to provide a method and system for enabling an enterprise gateway to handle dynamically assigned IP addresses from remote clients.

It is a further object of the invention to provide an improved method and system for supporting nested tunnels with coincident endpoints.

It is a further object of the invention to provide a method and system for supporting automatic nested tunnels with coincident endpoints.

It is a further object of the invention to provide a method and system for implementing nested tunnels by automatically detecting and establishing tunnels so as to achieve a nested implementation.

It is a further object of the invention to provide a method and system for providing, without customer configuration, tunnel or transport mode IP security (IPsec) at a remote endpoint, with the VPN role of the remote endpoint being host or gateway, with L2TP supported within the internal tunnel, and with an arbitrary level of tunnel nesting.

SUMMARY OF THE INVENTION

In accordance with the system and method of the invention, a request to establish a coincident endpoint for nesting a inner connection within an outer connection is received at a first node from a second node on the outer connection. The nodes participate in negotiations on the outer connection setting up the inner connection as a secure connection. Thereafter, responsive to communications on the inner connection, the first node establishes links to the outer connection selectively to receive or send communications double nested on the outer connection.

In accordance with an aspect of the invention, there is provided a computer program product configured to be operable to establish coincident endpoints for double nesting traffic on an inner connection to an outer connection.

Other features and advantages of this invention will become apparent from the following detailed description of the presently preferred embodiment of the invention, taken in conjunction with the accompanying drawings.

BRIEF DESCRIPTION OF THE DRAWINGS

FIG. 4 is a representation of the format of an entry in the pending nested connection table.

FIG. 5 is a representation of the logical packet headers for the key step in setting up the inner tunnel t2 in FIG. 2.

BEST MODE FOR CARRYING OUT THE INVENTION

Figure 1:
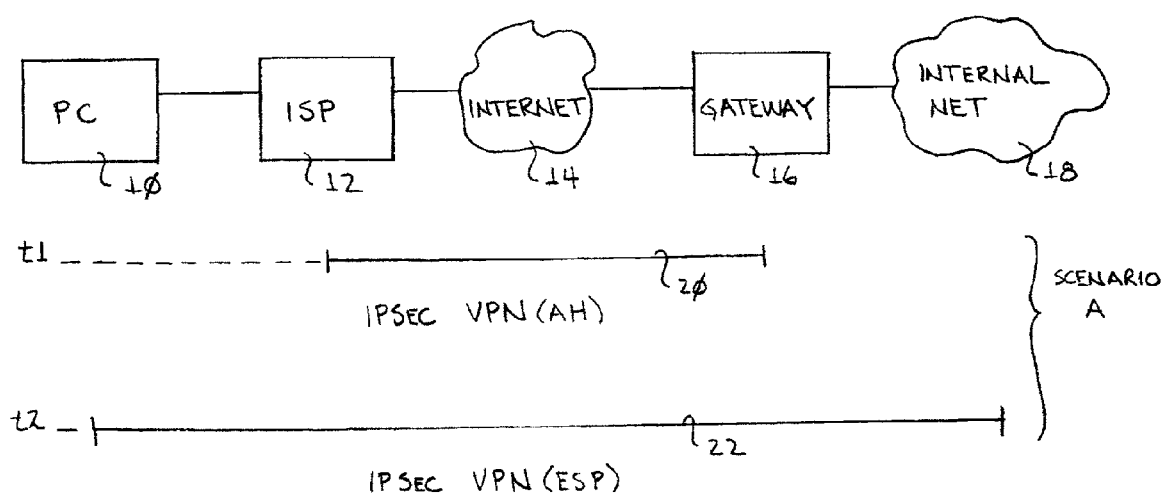
FIG. 1 is system and tunneling diagram illustrating a typical client/server connection in accordance with the prior art.
Figure 2:
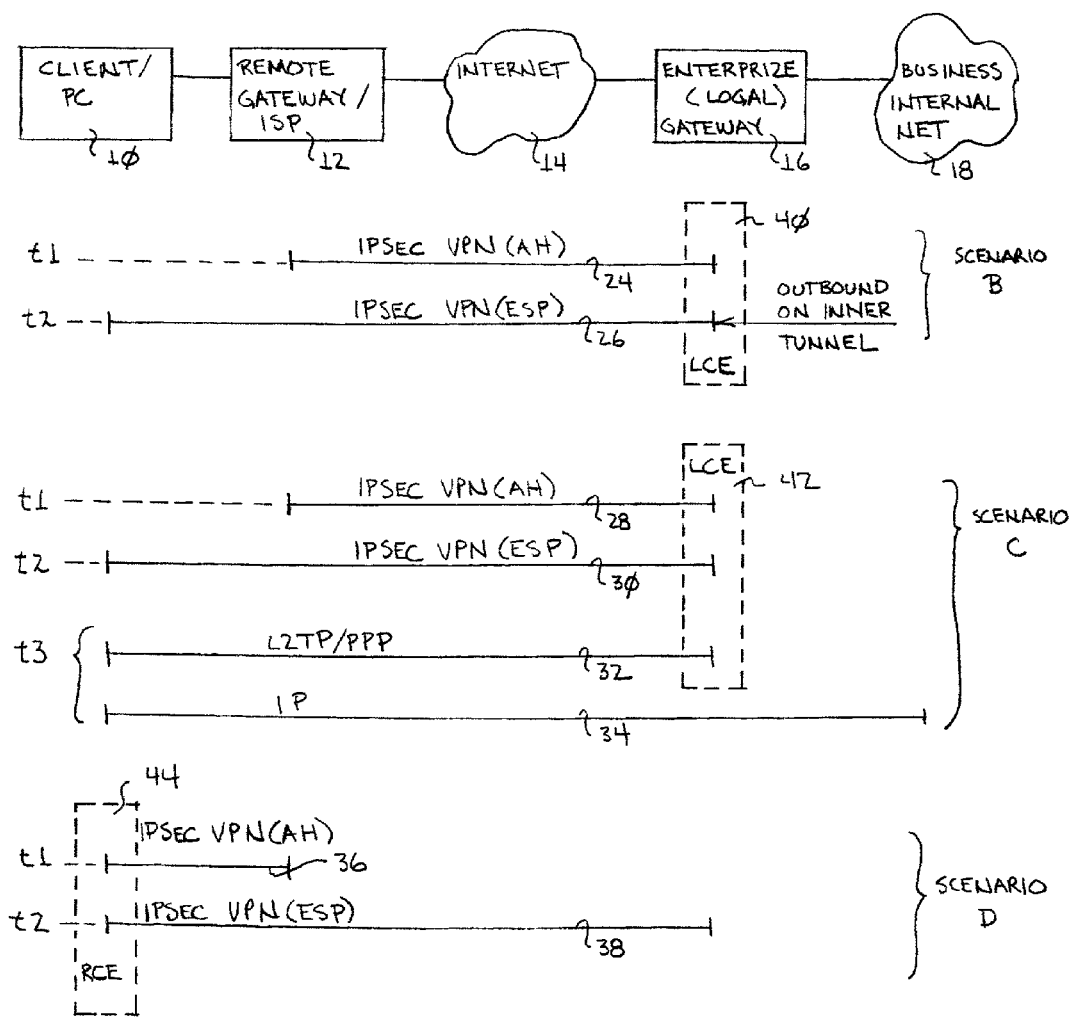
FIG. 2 is a system and tunneling diagram illustrating a client/server connection via local coincident endpoints in accordance with the preferred embodiments of the invention.

Referring to FIG. 2, the connection system and method of the preferred embodiments of the invention (represented by scenarios B, C and D) build nested connections t1, t2, and possibly t3, having coincident endpoints 40, 42 or 44 at various locations within the communication paths interconnecting a client PC 10 with a host server on network 18.

Referring to scenario B, client PC 10 is provided by remote gateway Internet service provider (ISP) 12 a non-dedicated IP address of some type. Both connections t1 24 and t2 26 end at the enterprise gateway 16 as represented by local coincident endpoint 40.

Scenario C addresses the problem of overlapping IPs. An ISP, in assigning IP addresses to its clients, will ensure that for these clients, each IP is unique. 'ISP' here means each ISP's point of connection. So, for example, if Time Warner had multiple domains across the country, each one would assign unique IP's to its clients, and each would establish an outer routing VPN connection to the enterprise gateway. The problem of clients with overlapping IP's comes from these multiple outer connections, all to the same gateway. The current invention solves this problem, but only when L2TP is used. Copending patent application Ser. No. 09/813,910 filed 21 Mar. 2001 solves this problem via VPN NAT.

L2TP (Layer 2 Tunnel Protocol) is defined by RFC2661. It is used to tunnel PPP (RFC1661) packets across an intervening network in a way that is as transparent as possible to both end-users and applications.

Referring to scenario C, client PC 10 is provided by remote gateway Internet service provider (ISP) 12 a non-dedicated IP address of some type. Both connections t1 28 and t2 30 end at the enterprise gateway 16 as represented by local coincident endpoint 42. By using L2TP with virtual PPP 32 to assign an IP address from the internal network 18 to the remote PC 10 via connection t3 32, 34, PC 10 can now communicate directly with the internal network as is represented by the IP connection 34. Copending patent application Ser. No. 09/813,910 filed 21 Mar. 2001, provides an alternative solution for providing nested tunnels with local coincident endpoints using the VPN NAT function described in co-pending U.S. patent application Ser. No. 09/240,720 filed 29 Jan. 1999.

Referring to scenario D, a remote coincident endpoint 44 is supported at client PC 10. Alternatively, client PC may be any remote client, such as an IBM AS/400 system.

In accordance with the preferred embodiments of the invention, nested tunnels are implemented and the correct system internals needed by the nested tunnel implementation is automatically set up—that is, set up without requiring customer configuration of the nesting of tunnels.

Nested tunnel support is achieved by chaining IPsec security associations (SAs) such that each SA may or may not point to another. For example, in scenario B, at gateway 16 end point 40, the outbound SA for t2 26 contains a pointer to the outbound SA for t1 24. IPsec processing to achieve the nesting is accomplished by starting with a first SA in a chain, applying it o the outbound datagram, then applying the next (chained) SA to the results of the previous SA, and so forth, until an SA is encountered that does not point to any SA. For inbound processing it is not necessary to chain the SAs to support nested coincident local endpoints 42, due to the way SAs are found for inbound traffic.

An automatic set of chained SAs to support nested tunnels is achieved by checking inbound datagrams decapsulated from t1 24 at gateway 16 after tunnel t1 24 has been established and before tunnel t2 26 is established. If the destination port is, say, 500 and the destination IP address is local (that is, defined on the current system 18), an entry is made into a pending nested connections table that includes the datagram IP addresses and the outbound SA that corresponds to the inbound SA just processed. Sometime later, when a connection is being started (that is, SAs are being loaded), the entries in the pending nested connections table are scanned to see if any match the loading connection (that is, the out SA IP address is compared to the table entry source IP address and the in SA IP address is compared to the table entry destination IP address). If a match is found, the loading outbound SAs SA pointer is set to point to the SA (outbound) in the table entry. The table entry is deleted. The result is that nested coincident endpoint tunnels are supported, and supported without customer configuration.

Each SA has a pointer to a successor SA (that is, a next SA). For many SA's this pointer is null. In some cases out SA's pointer has non-null value; in the case of a transport adjacent mode VPN connection (mentioned here for completeness) and nested VPN connection, this pointer has the address of the successor SA. During outbound ipsec processing, if an SA has a successor SA, the successor SA is used to process the packet after the 1st SA. In the case of nested connections, this results in two encapsulations.

Referring to FIG. 4, the format of an entry in the pending nested connection table is illustrated, including ikesip 200, ikedip 202, connection name 204, timestamp 206 and refcount 200 fields, where:

ikesip=IKE source IP address (of inbound)
ikedip=IKE destination IP address
connection name=system-wide unique VPN connection identifier
timestamp=of pending nested connection table entry (used to timeout and delete unused entries)
refcount=used to handle multiple concurrent starting inner tunnels Once a nesting relationship has been established for a connection, it is automatically maintained as SA refreshes occur at some interval (configured by customer). That is, as new SA's are negotiated and loaded for a nested connection, the logical relationship of that connections outbound SA to the outer tunnel outbound SA is transparently maintained. This relationship is also maintained for refreshes of the outer VPN connection SA's, at any time. So, for example, between the time the initial IKE inbound packet to establish t2 in FIG. 2 arrives, and the inner connection is loaded into the system kernel, the outer connection t1 may undergo a refresh of its SA's. This is also transparently handled by the system.

Figure 3:
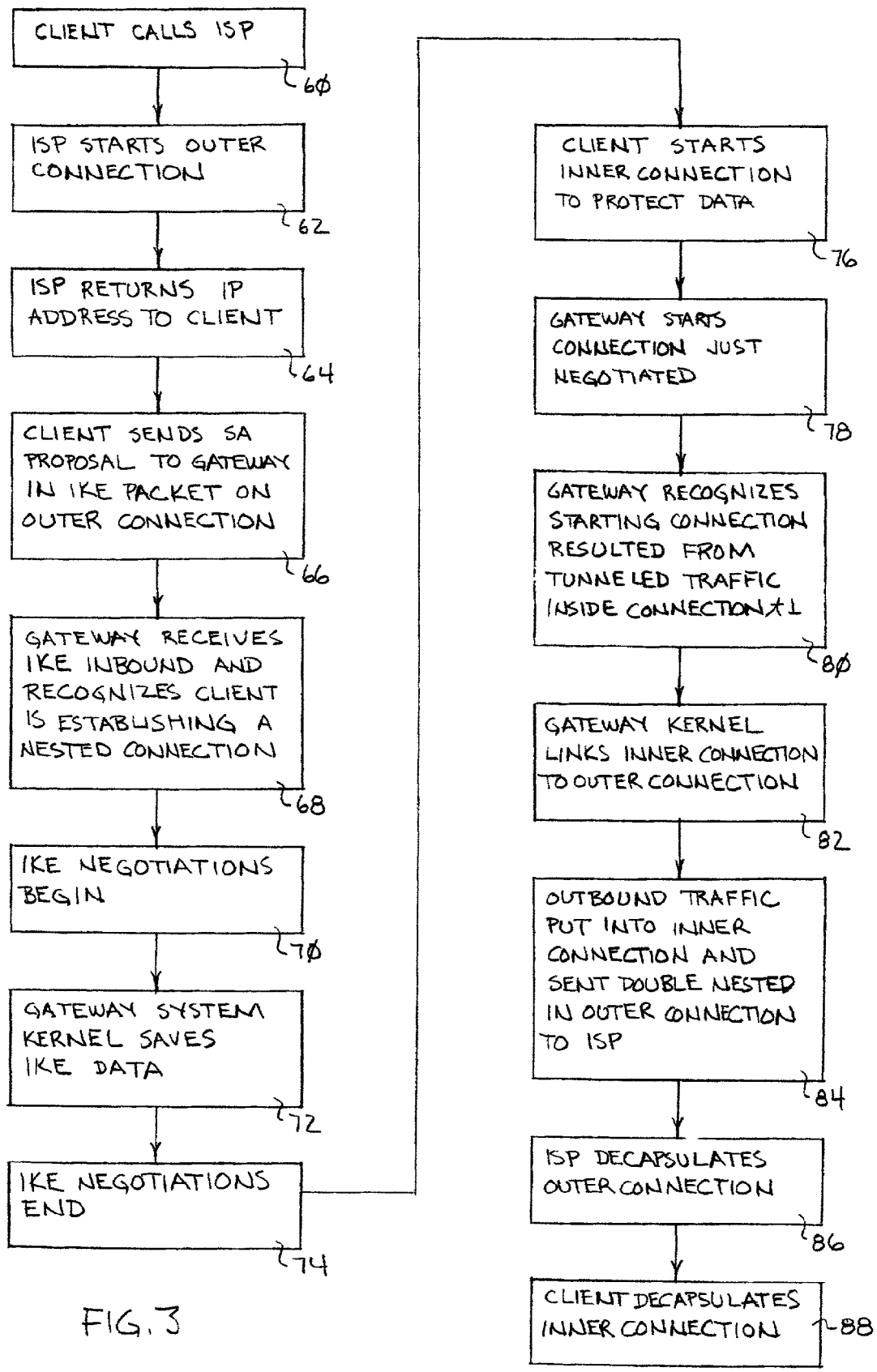
FIG. 3 is a flow chart representation of a preferred embodiment of the method of the invention.

Referring to FIG. 3, a preferred embodiment of the method of invention involving two VPN connections (or tunnels) t1 24 and t2 26 begins in step 60 by client 10 calling ISP 12. Common usage of the term "tunnel" refers to a VPN connection, which comes in two modes: tunnel mode and transport mode. A tunnel is a VPN connection. However, in the present invention, tunnels t1 24 and t2 26 are IPsec based VPNs, and will be, therefore, referred to as connections.

In step 62, ISP 12, as part of assigning an IP address, starts outer VPN connection t1 24. This is an authentication gateway, and is set up for the first client 10 to call in, and thereafter reused for subsequent clients. AH represents the authentication header of the IPsec protocol. Encapsulating security protocol (ESP) and AH together refer to Internet Protocol security (IPsec), a protocol defined by IETF RFCs 2401–2409.

The use of AH for the outer tunnel and ESP for the inner are meant to convey a typical scenario. The invention is not limited to supporting only AH outer and ESP inner, but rather applies to ESP or AH outer tunnel-mode VPN connection, and any combination of ESP or AH with transport or tunnel-mode, ESP & AH in transport adjacency, for the inner VPN connection. A important purpose of the outer AH tunnel is that it allows the ISP to assign non-global IP addresses to its clients, and then use the outer tunnel as a logical routing mechanism between it and the enterprise gateway.

In step 64, ISP 12 returns the IP address of outer connection 24 to client 10, and the client is ready communicate with gateway 16 to internal network, or internet 18.

At this point in the process, client 10 may begin communicating with his gateway 12 directly, which would transfer data through connection t1 24. The problem in doing so, however, is that data in outer connection t1 24 is visible as it flows through Internet 14, and visible at the ISP 12.

As previously noted, a key problem addressed by the present invention is how to support this basic configuration of having connection t2 26 nested in connection t1 24 with both ending at coincident local endpoint 40 at the gateway 16. In accordance with a preferred embodiment of the invention, this is resolved with gateway 16 supporting nested tunnels without requiring any work on part of system administrators of the enterprise network in accordance with steps 66 through 88. More specifically, basic VPN policy configuration is necessary for both the inner and outer VPN connections, but no configuration is necessary to support the nesting or local coincident endpoints.

In step 66 client 10 begins to set up inner connection 26 which, as an ESP connection, will protect data communicated from client 10 until it gets to enterprise gateway 16, where it will be decrypted and passed, for example, to a server internal to internet 18. In this process, outer tunnel t1 24 establishes that the data is coming from the correct ISP.

Referring to FIG. 5, the logical packet headers for the key step in setting up the inner tunnel t2 in FIG. 2 are illustrated.

Row 1>, which is read left to right, at client PC 10 represents the IKE packet just as it leaves the PC heading for the enterprise gateway to negotiate the inner VPN connection. Row 1> at ISP 12 is that packet as it leaves the ISP and continues on its way to the enterprise gateway. Row 1> at gateway 16 is the same packet just after the packet has been decapsulated at the enterprise gateway.

Row 1<, which is read from right to left and represents the response traffic (from enterprise gateway 16 back to PC 10, is similar.

Row 2a> occurs after the inner VPN connection is established and represents a data packet as it leaves the PC 10.

Row 2a<, which again is read right to left, illustrates the response traffic and the two decapsulations which occur at the enterprise gateway for a transport-mode VPN connection.

Row 2b> is similar to row 2a> except it assumes a tunnel-mode VPN connection.

Row 2b< is the response traffic, read right to left.

In step 66 client 10 sends an SA proposal to gateway 16 in an IKE packet on outer connection t1 24. This initializes a process for automatic setup of supporting configuration at gateway local coincident end point (LCE) 40. IPsec VPN connection t2 26 is established using the internet key exchange (IKE) protocol. In accordance with the IKE protocol, data going into connection t2 26 is encrypted with a key and a selectable algorithm. Data received at LCE 40 from connection t2 26 must be decrypted using the right key and algorithm. To accomplish this, IKE servers exist on client machine 10 and gateway 16, and these execute the IKE negotiations of steps 70–74 to agree on an encryption algorithm and key generation.

Thus, in step 66, to initiate IKE negotiations, the IKE server at client 10 sends a first packet (datagram) with initial proposal for a security association SA for inner connection t2 26. This IKE traffic has one important feature: all of this IKE traffic of steps 66–74 to set up connection t2 26 occurs on connection t1 24. A special function in gateway 16 at endpoint 40 watches for IKE traffic inbound. If an IKE packet is inbound and destined for this gateway system 16, then this function remembers the fact that IKE traffic has initiated from connection t1.

While, in steps 70–74, IKE traffic continues to flow back and forth, traffic subsequent to the first packet is redundant as far as the invention is concerned—for the first packet identifies that this client 10 is trying to establish a nested connection t1/t2 with gateway 16.

In step 70, IKE negotiation begins. In step 72, gateway 16 saves knowledge about these IKE negotiations in its system kernel. In step 74, IKE negotiation ends successfully.

In step 76, client 10 starts the connection t2 26 that has just been negotiated (note that at client 10, the connection t2 is not nested).

In step 78, the gateway 16 starts the connection t2 that has just been negotiated.

In step 80, gateway 16 recognizes that the starting VPN connection t2 is the result of prior tunneled IKE traffic from inside connection t1 24.

In step 82, code in the kernel of gateway 16 links the SA for this new, inner connection t2 26 to the proper SA for the outer connection t1 24 so that traffic is doubly nested. Thus, LCE 40 is created.

As a result of creating LCE 40, traffic outbound from network 18 is first put by gateway 16 in inner connection t2 26, then in outer connection t1 24 and sent doubly nested on to client 10. At ISP 12, the outer connection t1 24 is removed, and traffic continues on inner tunnel t2 26 to client 10, where it is decapsulated. (To encapsulate refers to putting data into a tunnel, or connection, and to decapsulate refers to removing that data from the tunnel or connection.)

In accordance with a further embodiment of the invnetion, outer connection 24 must be tunnel mode, but can be any of ESP, AH, or combined ESP and AH.

In accordance with a further embodiment of the invention, outer tunnel 24 or inner tunnel 26 can be using IP compression or not.

In accordance with a further embodiment of the invention, inner tunnel t2 26 can be either tunnel mode or transport mode.

In accordance with a further embodiment of the invention, referring to FIG. 2 scenario C, support is provided for a L2TP layer 2 transport protocol. As is described by scenario C, a customer could establishes an L2TP and IP connection t3 32, 34 inside of t2, which gives three nested tunnels. An advantage of so doing is that connection 34 looks like a client inside internet 18. That is, connection t3 32 gives client 10 an IP address internal to network 18.

Referring to FIG. 2, scenario D, another variation on the preferred embodiment of the invention is set forth. In scenario D, inner tunnel t2 38 is established between client 10 and local gateway 16, but outer tunnel t1 36 goes from client 10 to remote gateway 12. In this scenario D, steps 70 through 82 occur at client 10 where the coincident endpoints 44 exist.

Consequently, it is within the scope of the preferred embodiments of the invention to provide coincident end points at any processor: as in scenarios B and C, at the enterprise gateway 16; as in scenario D, at the client 10, or anywhere else they be configured. A third point for coincident endpoints may occur for example, at the ISP 12. Setting up such coincident endpoints is automatic in the sense that the processor kernel code, wherever the coincident endpoints are located, executes equivalent steps 70 through 82 to detect and set up nesting of connections having coincident endpoints.

Advantages over the Prior Art

It is an advantage of the invention that there is provided an improved method and system for managing connections within a communications system.

It is a further advantage of the invention that there is provided an improved method and system for connecting a remote client to an enterprise network through a local gateway.

It is a further advantage of the invention that there is provided a method and system for enabling an enterprise gateway to handle dynamically assigned IP addresses from remote clients.

It is a further advantage of the invention that there is provided an improved method and system for supporting nested tunnels with coincident endpoints.

It is a further advantage of the invention that there is provided a method and system for supporting nested tunnels with coincident endpoints without requiring customer configuration of tunnel relationships.

It is a further advantage of the invention that there is provided a method and system for implementing nested tunnels by automatically detecting and establishing tunnels so as to achieve a nested implementation.

It is a further advantage of the invention that there is provided a method and system for providing, without customer configuration, tunnel or transport mode IP security (IPsec) at a remote endpoint, with the VPN role of the remote endpoint being host or gateway, with L2TP supported within the internal tunnel, and with an arbitrary level of tunnel nesting.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

While the invention has been described rather specifically to an Internet environment using current technologies (today's Internet is built on IPv4), it applies to any existing or future Internet technology that employs IKE or the equivalent to negotiate VPN, such as IPv6, which is described in RFC 2460.

Accordingly, the scope of protection of this invention is limited only by the following claims and their equivalents.

We claim:

1. Method for nesting IP Sec-based VPN connections between a plurality of nodes in a communication network in which nested connections establish a tunnel within a tunnel including an inner connection and an outer connection having at least one coincident endpoint residing on a same node, comprising the steps of:
    receiving at a first node on said outer connection a request from a second node to establish a coincident endpoint for nesting a secure inner connection within said outer connection;
    negotiating over said outer connection parameters defining said inner connection and resulting from Internet key exchange (IKE) negotiations for establishing an agreed upon encryption algorithm and key generation; and thereafter
    responsive to communication occurring on said inner connection, at said first node linking said inner connection to said outer connection for selectively receiving and sending said communication double nested on said outer connection to allow subsequent traffic to be correctly processed by said inner connection, then by said outer connection, at both ends of both connections and thereby enabling outbound traffic between respective nodes selectively to flow inside said outer tunnel and not said inner tunnel, in said inner tunnel and said outer tunnel, and in neither tunnel.

2. The method of claim 1, further comprising the step of using Layer 2 Tunnel Protocol (L2TP) to tunnel packets across said communication network.

3. Method for operating an enterprise gateway node to a plurality of nodes in a communication network in which nested connections establish an inner tunnel within an outer tunnel including an inner connection and an outer connection having at least one coincident endpoint residing on a said gateway node, comprising the steps of:
    receiving at said gateway node from a remote client node a request to establish an outer connection;
    receiving at said gateway over said outer connection a request to establish, and thereupon negotiating parameters establishing, a secure inner connection using Internet key exchange (IKE) negotiations for establishing an agreed upon encryption algorithm and key generation and further including establishing a local coincident endpoint of said inner and outer connections at said gateway;
    responsive to outbound or inbound traffic on said inner connection, establishing links to said outer connection for communicating said traffic double nested on said outer connection to allow subsequent traffic to be correctly processed by said inner connection, then by said outer connection, at both ends of both connections and thereby enabling outbound traffic between respective nodes selectively to flow inside said outer tunnel and not said inner tunnel, in said inner tunnel and said outer tunnel, and in neither tunnel.

4. The method of claim 3, further comprising the step of:
    tunneling packets across said communication network using Layer 2 Tunnel Protocol (L2TP).

5. A method for operating a first one of a plurality of nodes in a communications network in which nested connections establish an inner tunnel within an outer tunnel including an inner connection and an outer connection having at least one coincident endpoint residing on said first node, comprising the steps of:
    establishing at said first node a coincident endpoint for an outer connection and an inner connection with at least one second node in said network for setting up a tunnel within a tunnel between said first and second nodes and executing Internet key exchange (IKE) negotiations for establishing an agreed upon encryption algorithm and key generation;

responsive to starting communication of traffic over said connections, establishing a link from said inner connection to said outer connection including establishing a local coincident endpoint of said inner and outer connections at said first node; and responsive to said links, selectively encapsulating said traffic to said outer connection for transfer to said second node and decapsulating said traffic from said outer connection followed by decapsulating said traffic from said inner connection for receipt at said first node.

6. The method of claim 5, said inner connection being a secure connection.

7. The method of claim 5, further comprising the step of: tunneling packets across said communication network using Layer 2 Tunnel protocol (L2TP).

8. Method for nesting connections in a tunnel within a tunnel having at least one coincident endpoint between a plurality of nodes in a communication network, said nodes including a client, an Internet service provider (ISP), an enterprise gateway, and an internal network, comprising the steps of:

operating said client node to call said ISP node;

operating said ISP node to start an outer connection with respect to said gateway node and to return an IP address to said client node;

operating said client node to send to said gateway node over said outer connection a request to establish a secure nested inner connection;

operating said client node and said gateway node to negotiate over said outer connection parameters defining said secure nested inner connection resulting from Internet key exchange (IKE) negotiations for establishing an agreed upon encryption algorithm and key generation, and saving said parameters at said gateway node; and thereafter operating said client node to start said inner connection;

operating said ISP node to decapsulate said outer connection;

operating said client node to decapsulate said inner connection; and operating said gateway node to recognize the start of said inner connection and to link said inner connection to said outer connection to allow subsequent traffic to be correctly processed by said inner connection, then by said outer connection, at both ends of both connections, and sending outbound traffic in said inner connection double nested in said outer connection.

9. The method of claim 8, further comprising the step of: tunneling packets across said communication network using Layer 2 Tunnel protocol (L2TP).

10. System for nesting connections between a plurality of nodes in a communication network in which nested connections establish a tunnel within a tunnel including an inner connection and an outer connection having at least one coincident endpoint residing on a same node, comprising:

a first node on an outer connection for receiving a request from a second node to establish a coincident endpoint for nesting an inner connection within said outer connection including executing Internet key exchange (IKE) negotiations for establishing an agreed upon encryption algorithm and key generation;

said first and second nodes negotiating over said outer connection parameters defining said inner connection; and thereafter said first node being responsive to communication occurring on said inner connection for linking to said outer connection for selectively receiving or sending said communication double nested on said outer connection to allow subsequent traffic to be correctly processed by said inner connection, then by said outer connection, at both ends of both connections;

thereby enabling outbound traffic between respective nodes selectively to flow inside said outer tunnel and not said inner tunnel, in said inner tunnel and said outer tunnel, and in neither tunnel.

11. The system of claim 10, said inner connection being a secure connection.

12. The system of claim 11, said inner connection being an IPsec connection.

13. The system of claim 12, further comprising a Layer 2 Tunnel protocol (L2TP) connection for tunneling packets across said communication network.

14. A program storage device readable by a machine, tangibly embodying a program of instructions executable by a machine to perform method steps for nesting connections between a plurality of nodes in a communication network in which nested connections establish a tunnel within a tunnel including an inner connection and an outer connection having at least one coincident endpoint residing on a same node, said method steps comprising:

receiving at a first node on an outer connection a request from a second node to establish a coincident endpoint for nesting an inner connection within said outer connection;

negotiating over said outer connection parameters defining said inner connection resulting from Internet key exchange (IKE) negotiations for establishing an agreed upon encryption algorithm and key generation; and thereafter responsive to communication occurring on said inner connection, at said first node linking to said outer connection for selectively receiving or sending said communication double nested on said outer connection to allow subsequent traffic to be correctly processed by said inner connection, then by said outer connection, at both ends of both connections.

15. A program storage device readable by a machine, tangibly embodying a program of instructions executable by a machine to perform method steps for operating an enterprise gateway in a communications network in which nested connections establish a tunnel within a tunnel including an inner connection and an outer connection having at least one coincident endpoint residing on a same node, said method steps comprising:

receiving at said gateway from a remote client a request to establish an outer connection;

receiving at said gateway over said outer connection a request to establish, and thereupon negotiating parameters including executing Internet key exchange (IKE) negotiations for establishing an agreed upon encryption algorithm and key generation for establishing, a secure inner connection;

responsive to outbound or inbound traffic on said inner connection, establishing links to said outer connection for communicating said traffic double nested on said outer connection to allow subsequent traffic to be correctly processed by said inner connection, then by said outer connection, at both ends of both connections thereby enabling outbound traffic between respective nodes selectively to flow inside said outer tunnel and not said inner tunnel, in said inner tunnel and said outer tunnel, and in neither tunnel.

16. A program storage device readable by a machine, tangibly embodying a program of instructions executable by a machine to perform method steps for operating a first one of a plurality of nodes in a communications network in which nested connections establish a tunnel within a tunnel including an inner connection and an outer connection having at least one coincident endpoint residing on a same node, comprising the steps of:

establishing at said first node a coincident endpoint for an outer connection and an inner connection with at least one second node in said network;

responsive to starting communication of traffic over said connections, establishing a link from said inner connection to said outer connection including executing Internet key exchange (IKE) negotiations for establishing an agreed upon encryption algorithm and key generation; and responsive to said links, selectively encapsulating said traffic to said outer connection for transfer to said second node or decapsulating said traffic from said outer connection for receipt at said first node to allow subsequent traffic to be correctly processed by said inner connection, then by said outer connection, at both ends of both connections.

17. A computer program product for nesting connections between a plurality of nodes in a communication network in which nested connections establish a tunnel within a tunnel including an inner connection and an outer connection having at least one coincident endpoint residing on a same node, said computer program product comprising:

a digital recording medium;

first program instructions for receiving at a first node on an outer connection a request from a second node to establish a coincident endpoint for nesting an inner connection within said outer connection;

second program instructions for negotiating over said outer connection parameters defining said inner connection resulting from Internet key exchange (IKE) negotiations for establishing an agreed upon encryption algorithm and key generation; and thereafter third program instructions, responsive to communication occurring on said inner connection, at said first node linking to said outer connection for selectively receiving or sending said communication double nested on said outer connection to allow subsequent traffic to be correctly processed by said inner connection, then by said outer connection, at both ends of both connections; thereby enabling outbound traffic between respective nodes selectively to flow inside said outer tunnel and not said inner tunnel, in said inner tunnel and said outer tunnel, and in neither tunnel; and wherein said first, second and third program instructions are recorded on said digital recording medium.

18. A computer program product for operating an enterprise gateway node to a network in which nested connections establish a tunnel within a tunnel including an inner connection and an outer connection having at least one coincident endpoint residing on said gateway node, said computer program product, comprising:

a digital recording medium;

first program instructions for receiving at said gateway from a remote client a request to establish an outer connection;

second program instructions for receiving at said gateway over said outer connection a request to establish, and thereupon negotiating parameters establishing, a secure inner connection resulting from Internet key exchange (IKE) negotiations for establishing an agreed upon encryption algorithm and key generation;

third program instructions, responsive to outbound or inbound traffic on said inner connection, for establishing links to said outer connection for communicating said traffic double nested on said outer connection to allow subsequent traffic to be correctly processed by said inner connection, then by said outer connection, at both ends of both connections; and wherein said first, second, and third program instructions are recorded on said digital recording medium.

19. A computer program product for operating a first one of a plurality of nodes in a communications network in which nested connections establish a tunnel within a tunnel including an inner connection and an outer connection having at least one coincident endpoint residing on a same node said computer program product comprising:

a magnetic recording medium;

first program instructions for establishing at said first node a coincident endpoint for an outer connection and an inner connection with at least one second node in said network;

second program instructions, responsive to starting communication of traffic over said connections, for executing Internet key exchange (IKE) negotiations for establishing an agreed upon encryption algorithm and key generation and establishing a link from said inner connection to said outer connection; and third program instructions, responsive to said links, for selectively encapsulating said traffic to said outer connection for transfer to said second node or decapsulating said traffic from said outer connection for receipt at said first node to allow subsequent traffic to be correctly processed by said inner connection, then by said outer connection, at both ends of both connections; and wherein said first, second, and third program instructions are recorded on said medium.

* * * * *